Feb. 16, 1932.  J. V. PUGH  1,845,185
VEHICLE WHEEL
Filed Oct. 25, 1928
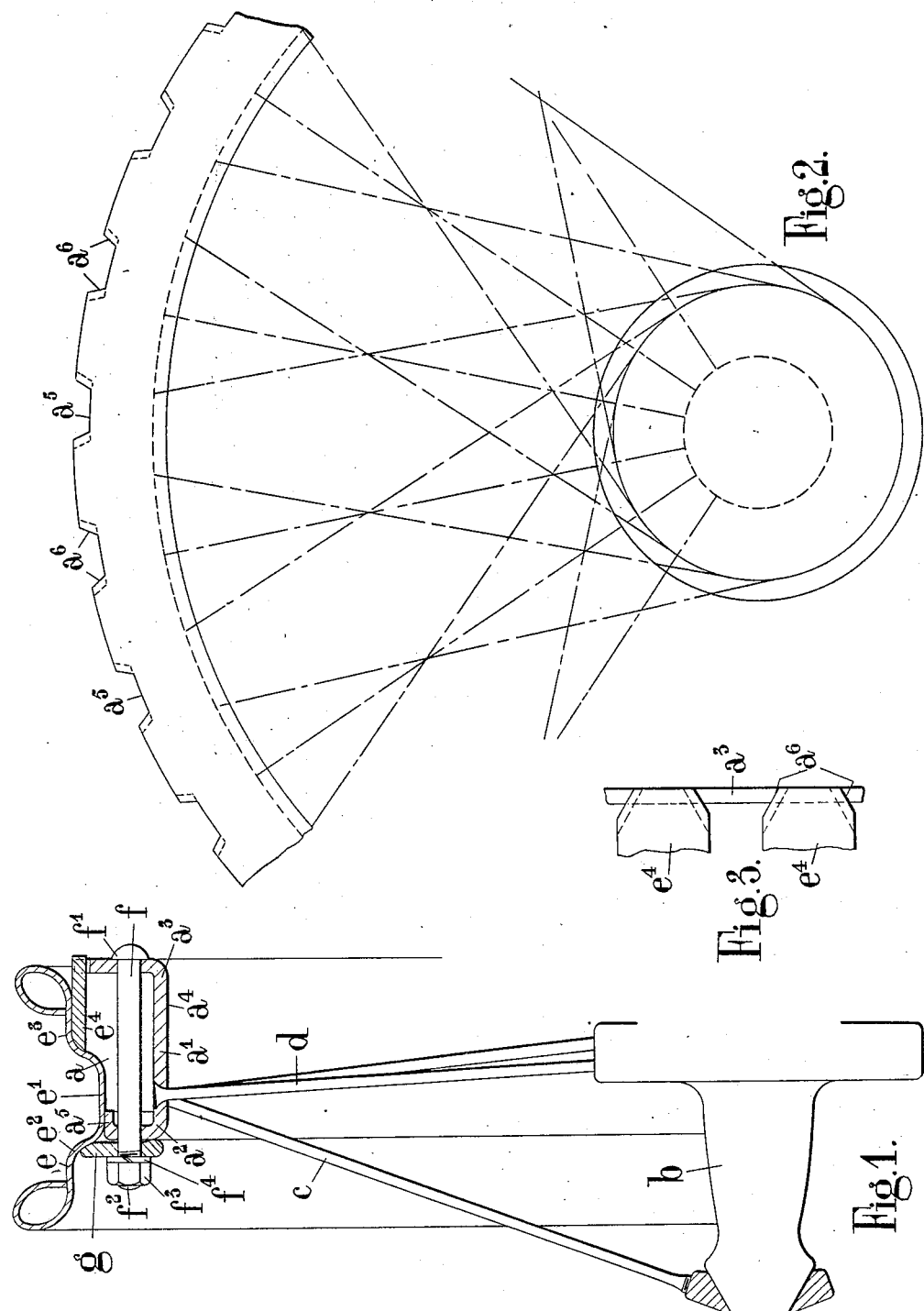

Patented Feb. 16, 1932

1,845,185

UNITED STATES PATENT OFFICE

JOHN VERNON PUGH, OF MERIDEN, ENGLAND

VEHICLE WHEEL

Application filed October 25, 1928, Serial No. 315,077, and in Great Britain November 4, 1927.

This invention relates to vehicle wheels of the type in which a detachable rim for carrying a tyre is mounted upon the remainder of the wheel structure which may comprise brake drum parts.

The exacting requirements of modern motor vehicle traffic render the provision of ample braking facilities of the greatest importance and not only are large diameter and wide brake drums becoming necessary but the practice of fitting brakes to more than two of the wheels of a vehicle is increasing.

The object of the present invention is to facilitate and cheapen the formation of brake gear appliances and the incorporation of brake drums in the wheels of vehicles.

The invention consists in a vehicle wheel having a brake drum structure capable of resisting the stresses caused by the weight of the vehicle and the torsional and side forces in combination with a readily detachable tyre-carrying rim or felloe attached solely to said brake drum structure by means ensuring concentricity and force transmitting contact.

The invention further consists in a combined wheel structure in accordance with the preceding paragraph having a brake drum comprising a ring of channel-shaped section in which the material is economically disposed to afford stiffness and ample load supporting surface, said ring being connected to a hub or axle member by tension wire or like spokes.

The invention further consists in a wheel structure in accordance with the preceding paragraph in which the heads of straight spokes are positioned near that edge of the brake drum which is remote from the vehicle while the spokes are arranged in two sets having their screw-threaded roots well separated at the hub or axle, the set nearest the vehicle lying closely adjacent to a flat surface or very blunt cone and being subjected to considerable stress while mainly carrying the load and torsional stresses while the other set approximates to a sharper cone surface and is stressed to a smaller extent while mainly withstanding the side stresses.

The invention further consists in a wheel and brake drum structure as indicated in which the brake drum is formed from a channel section band the base of which provides a plain cylindrical ring the interior of which constitutes a friction surface with an exterior flange on the side remote from the vehicle forming a supporting means for a tyre-carrying rim and a wider flange on the side near the vehicle upon which centring and torque transmitting engagement is effected.

The invention further consists in a brake drum section according to the preceding paragraph in which the flange remote from the vehicle has a turned-down upper edge parallel to the base and affording a wide seat for a tyre-carrying rim while the wider flange has tapering recesses which accommodate wedge-shaped projections of the tyre-carrying rim to eliminate rotational slackness in the joint.

The invention also consists in improvements in or relating to vehicle wheels as hereinafter described.

Referring now to the accompanying drawings:—

Figure 1 is a half section through a brake drum and wheel tyre supporting structure in accordance with the invention;

Figure 2 is a fragmental view from the inside, and

Figure 3 is a fragmental plan showing the wedge-shaped and inclined engaging means between the brake drum flange and the tyre-carrying rim.

In carrying the invention into effect in one convenient form illustrated in the drawings a brake drum ring $a$ is formed from channel-like section material having a flat base $a'$ and sides $a^2$, $a^3$ standing at right angles thereto the ring being conveniently formed in any suitable manner by rolling or other processes or from material bent to shape and joined.

The base $a'$ of the channel constitutes a cylindrical body the interior cylindrical surface $a^4$ of which forms the friction surface of the brake drum and the sides $a^2$, $a^3$ of the channel form flanges projecting on the exterior at each edge of the base.

The brake drum ring $a$ is connected to an axle fitting such as a hub or axle member $b$ by means of two sets of straight and headed spokes $c$ and $d$ and the spokes of both sets penetrate the base $a'$ of the ring closely adjacent to the flange $a^2$. The set of spokes $d$ which is adjacent to the vehicle is disposed to correspond with the surface of a very blunt or flat cone with the apex directed towards the vehicle and the spokes in this set will be highly stressed and capable of supporting the weight of the vehicle and also of transmitting all the forces due to driving and braking. The other set of spokes $c$ which is farther away from the vehicle is disposed adjacent a cone surface of a smaller contained angle and with its apex directed away from the vehicle. These spokes are less highly stressed and are arranged mainly to withstand side stresses to which the tyre or rim of the wheel may be subjected.

In the case of a hub being used as shown the roots or threaded ends of the spokes $d$ may be positioned closely adjacent to the inner end of the hub while the spokes $c$ may be suitably connected to the outer end thereof or to the extremity of an axle end.

The two brake ring flanges $a^2$, $a^3$ are of different widths, the one $a^2$ upon the side remote from the vehicle being of a smaller radial depth than the one upon the other side and the edge of the flange $a^2$ forming a load supporting and locating ring upon which a considerable band of the interior cylindrical surface $e'$ of a tyre-carrying rim $e$ is positioned and supported. As shown the flange $a^2$ is made wide enough for the edge $a^5$ to be turned down towards the other flange $a^3$ so that for a certain distance it lies parallel with the cylindrical base $a'$ of the ring and thus affords a wider supporting surface for the interior of the tyre-carrying rim $e$.

The flange $a^3$ upon the edge of the brake ring $a$ adjacent to the vehicle is of greater radial depth than the flange $a^2$ and the exterior edge thereof is made circular and notched as hereinafter described, this edge forming a support for the inner edge of the tyre-carrying rim $e$, the rim being attached to the brake ring or drum $a$ by bolts or other attachment means preferably passing through apertures in one or both of the flanges $a^2$, $a^3$.

The convenient form of attachment shown in the drawings consists of a series of bolts $f$ which are provided with heads $f'$ and which pass transversely across the brake ring $a$ through apertures in the two flanges $a^2$, $a^3$; the heads $f'$ of the bolts are upon the side adjacent to the vehicle and stops (not shown) may be provided under the heads to prevent rotation of the bolts in the holes.

The points $f^2$ of the bolts $f$ project a short distance beyond the flange $a^2$ of the brake ring and upon these ends clip plates or dogs $g$ are provided which are rotatable upon the bolts and are long enough when occupying a radial position to contact with and press upon the inner edge of the flange $a^2$ and the outer side $e^2$ of the well of the tyre-carrying rim $e$. The width of the dogs is preferably such that when turned at right angles or in a circumferential direction the tyre-carrying rim $e$ may be slipped over them into position without necessitating their removal from the bolts $f$. The dogs or clip plates $g$ are retained upon the bolts by nuts $f^3$ which may be fitted with safety washers $f^4$ or any other convenient locking means.

To concentrically support the inner edge of the tyre-carrying rim $e$ upon the brake ring $a$ and obviate rotational movement or slackness under torque the outer edge of the flange $a^3$ of the brake ring is as shown provided with a series of recesses $a^5$ having tapering and inclined sides $a^6$ so formed that they are narrowest upon the side adjacent to the vehicle and the inner surface $e^3$ of this edge of the tyre-carrying rim $e$ is provided with a series of wedge-shaped members $e^4$ rigidly attached thereto and adapted to enter the tapering and inclined sided recesses $a^5$ for a certain distance when they will wedge tightly therein and prevent further movement of the tyre-carrying rim $e$ upon the brake ring $a$ in an axial, rotational or radial direction.

Although the brake drum or ring is described as provided with tension wire spokes it is to be understood that the brake ring may if desired be connected to the hub or axle end in any other convenient way. It is also to be understood that the way of supporting and retaining the tyre-carrying rim upon the brake drum ring is given by way of example and may be varied in detail as desirable.

Having now described my invention, what I claim as new and desire to secure by Letters Patent is:—

1. A vehicle wheel comprising a rim-supporting member, flanges on the sides of said member, an angled cylindrical seating band region on the flange remote from the vehicle, flaring recesses in the edge of the other flange, a tyre-carrying unsplit rim supported upon said seating band region, tongues on said rim engaging only the flared edges of said recesses to force said rim radially outwards, and means holding said tongues in said recesses.

2. A vehicle wheel comprising a rim supporting member, flanges projecting radially outwards from each side of said member, an outer seating region on the flange remote from the vehicle disposed cylindrically towards the other flange, flaring sided recesses formed in the edge of the other flange of a greater width on the side adjacent the seating region than on the other side, an unsplit central well tyre-carrying rim supported round its entire circumference upon said seating region, a great number of tongues projecting from said rim to engage the flaring sides of said recesses, bolts passing through holes in both said flanges and clip plates held by said bolts against said rim to retain it in position.

3. A vehicle wheel comprising a rim-supporting member, a wide cylindrical seating surface carried thereby, an unsplit thin section tyre rim supported towards one side on said surface, a number of tapering tongues having radially bevelled sides projecting from the other side of said rim and complementary notches in the adjacent edge of the rim-supporting member into which said tongues are forced when mounting the rim.

In testimony whereof I have signed my name to this specification.

JOHN VERNON PUGH.